United States Patent
Deiss

(10) Patent No.: US 8,939,755 B2
(45) Date of Patent: Jan. 27, 2015

(54) METHOD AND DEVICE FOR THE PRODUCTION OF POLYAMIDE

(75) Inventor: Stefan Deiss, Harxheim (DE)

(73) Assignee: Automatik Plastics Machinery GmbH, Grossostheim (DE)

( * ) Notice: Subject to any disclaimer, the term of this patent is extended or adjusted under 35 U.S.C. 154(b) by 178 days.

(21) Appl. No.: 12/790,557

(22) Filed: May 28, 2010

(65) Prior Publication Data

US 2010/0237521 A1  Sep. 23, 2010

(30) Foreign Application Priority Data

Nov. 28, 2007 (DE) .......................... 10 2007 057 189
Nov. 20, 2008 (DE) ................. PCT/DE2008/001929

(51) Int. Cl.
*B29B 9/06* (2006.01)
*B29B 9/16* (2006.01)
(Continued)

(52) U.S. Cl.
CPC .............. *B29B 9/16* (2013.01); *B01D 11/0253* (2013.01); *B29B 9/065* (2013.01); *C08G 69/48* (2013.01); *C08J 3/12* (2013.01); *C08J 2377/00* (2013.01); *Y10S 425/23* (2013.01)
USPC ................. 425/445; 425/67; 425/68; 425/70; 425/71; 425/215; 425/316; 425/377; 425/404; 425/DIG. 230; 264/14; 264/37.1; 264/37.2; 264/37.26; 264/211.13; 241/24.11; 521/40

(58) Field of Classification Search
CPC .... B29B 9/065; B29B 9/16; B29B 2009/168; C08J 3/12
USPC ........... 425/67, 68, 69, 70, 71, 377, 404, 445, 425/313, DIG. 230, 215, 316; 528/336, 480; 264/14, 37.1, 37.2, 37.26, 37.32, 117, 264/118, 140, 141, 142, 143, 176.1, 204, 264/211.13, 233, 913; 241/24.1, 24.11, 241/24.28; 521/40
See application file for complete search history.

(56) References Cited

U.S. PATENT DOCUMENTS 3,374,207 A    3/1968  Ryffel et al.
3,843,060 A *  10/1974 Colburn ......................... 241/19
(Continued)

FOREIGN PATENT DOCUMENTS

DE    1209293 A    1/1966
DE    1519936 A    3/1970
(Continued)

OTHER PUBLICATIONS

Database WPI Week 200749 Thomson Scientific, London, GB; AN 2007-496744 XP002519799—Date : Jul. 2007.

*Primary Examiner* — Seyed Masoud Malekzadeh
(74) *Attorney, Agent, or Firm* — Buskop Law Group, PC; Wendy Buskop

(57) ABSTRACT

The invention relates to a device for the implementation of a method for the production of pellets of polyamide 6 or copolyamides. The method can include production of a melt of polyamide 6 or copolyamides by means of polymerization, production of pellets from the melt by means of underwater pelletization into a process fluid, removal of the pellets from a site of underwater pelletization in the process fluid, supply of the pellets in the process fluid to an extraction stage, extraction of low-molecular components as extract, and drying of the pellets after extraction, wherein the underwater pelletization stage and the extraction stage take place using the same process fluid.

7 Claims, 3 Drawing Sheets

(51) Int. Cl.
*B01D 11/02* (2006.01)
*C08G 69/48* (2006.01)
*C08J 3/12* (2006.01)

(56) References Cited

U.S. PATENT DOCUMENTS

| | | | |
|---|---|---|---|
| 4,073,773 A * | 2/1978 | Banucci et al. | 528/208 |
| 4,158,682 A * | 6/1979 | Price et al. | 264/40.4 |
| 4,385,016 A * | 5/1983 | Gwinn | 264/37.26 |
| 4,517,316 A * | 5/1985 | Mason | 521/81 |
| 4,616,055 A * | 10/1986 | Mason | 524/381 |
| 4,669,396 A * | 6/1987 | Resh | 110/233 |
| 4,921,625 A * | 5/1990 | Gorman et al. | 508/233 |
| 5,073,600 A * | 12/1991 | Gorman et al. | 525/264 |
| 5,169,582 A * | 12/1992 | Illing | 264/141 |
| 5,266,256 A * | 11/1993 | Jerman et al. | 264/211.24 |
| 5,367,022 A * | 11/1994 | Kiang et al. | 525/74 |
| 5,439,974 A * | 8/1995 | Mattson | 525/74 |
| 5,569,713 A * | 10/1996 | Lieberman | 525/146 |
| 5,587,449 A * | 12/1996 | Fleischer et al. | 528/232 |
| 5,962,538 A * | 10/1999 | Wiltzer et al. | 521/48 |
| 5,973,105 A * | 10/1999 | Wiltzer et al. | 528/323 |
| 6,114,495 A * | 9/2000 | Kolstad et al. | 528/354 |
| 6,194,537 B1 | 2/2001 | Raue et al. | |
| 6,217,804 B1 * | 4/2001 | Lieberman | 264/102 |
| 6,320,021 B1 * | 11/2001 | Hildenbrand et al. | 528/499 |
| 6,326,460 B1 * | 12/2001 | Mohrschladt et al. | 528/492 |
| 6,353,086 B1 * | 3/2002 | Kolstad et al. | 528/354 |
| 6,429,279 B1 * | 8/2002 | Hunger et al. | 528/310 |
| 6,573,314 B1 * | 6/2003 | Knudsen et al. | 523/223 |
| 6,716,925 B2 * | 4/2004 | Botros | 525/285 |
| 6,740,733 B2 * | 5/2004 | Lee et al. | 528/499 |
| 6,838,029 B2 * | 1/2005 | Kawahara et al. | 264/141 |
| 6,984,116 B2 * | 1/2006 | Lee et al. | 425/6 |
| 7,071,291 B2 * | 7/2006 | Thompson et al. | 528/491 |
| 7,157,032 B2 * | 1/2007 | Eloo | 264/143 |
| 7,192,545 B2 * | 3/2007 | Ekart et al. | 264/211.13 |
| 7,199,163 B2 * | 4/2007 | Bigiavi et al. | 528/480 |
| 7,279,535 B2 * | 10/2007 | Konig et al. | 526/88 |
| 7,300,999 B2 * | 11/2007 | Deiss et al. | 528/272 |
| 7,304,123 B2 * | 12/2007 | Thompson et al. | 528/491 |
| 7,414,095 B2 * | 8/2008 | Penzo et al. | 525/383 |
| 7,421,802 B2 * | 9/2008 | Roberts et al. | 34/312 |
| 7,638,593 B2 * | 12/2009 | DeBruin et al. | 528/308.1 |
| 7,666,517 B2 * | 2/2010 | Thompson et al. | 428/480 |
| 7,776,242 B2 * | 8/2010 | Sato et al. | 264/14 |
| 7,819,942 B2 * | 10/2010 | Christel et al. | 95/37 |
| 7,828,538 B2 * | 11/2010 | Fellinger | 425/67 |
| 7,943,726 B2 * | 5/2011 | Haubs et al. | 528/365 |
| 8,039,581 B2 * | 10/2011 | Ekart et al. | 528/499 |
| 2001/0030031 A1 * | 10/2001 | Willemse | 162/157.6 |
| 2003/0109640 A1 * | 6/2003 | Lee et al. | 525/222 |
| 2003/0152793 A1 * | 8/2003 | Willemse | 428/542.8 |
| 2004/0034166 A1 * | 2/2004 | Botros | 525/192 |
| 2004/0043906 A1 * | 3/2004 | Heath et al. | 507/200 |
| 2004/0176565 A1 * | 9/2004 | Lee et al. | 528/308 |
| 2004/0254281 A1 * | 12/2004 | Thompson et al. | 524/425 |
| 2005/0035483 A1 | 2/2005 | Jackson et al. | |
| 2005/0049362 A1 * | 3/2005 | Buckley et al. | 525/132 |
| 2005/0110184 A1 * | 5/2005 | Eloo | 264/143 |
| 2006/0080855 A1 * | 4/2006 | Roberts | 34/59 |
| 2006/0108703 A1 * | 5/2006 | Uchiumi et al. | 264/85 |
| 2006/0189783 A1 * | 8/2006 | Deiss et al. | 528/272 |
| 2006/0191155 A1 * | 8/2006 | Roberts et al. | 34/312 |
| 2006/0252912 A1 * | 11/2006 | Hoffmockel et al. | 528/425 |
| 2006/0279019 A1 * | 12/2006 | Di Federico et al. | 264/237 |
| 2007/0069415 A1 * | 3/2007 | Moriyama et al. | 264/140 |
| 2007/0109911 A1 * | 5/2007 | Neubauer | 366/77 |
| 2007/0135614 A1 * | 6/2007 | Ekart et al. | 528/272 |
| 2007/0185308 A1 * | 8/2007 | Haubs et al. | 528/425 |
| 2007/0264375 A1 * | 11/2007 | Mori et al. | 425/97 |
| 2007/0270533 A1 * | 11/2007 | Ekart et al. | 524/354 |
| 2009/0057935 A1 * | 3/2009 | Sato et al. | 264/5 |

FOREIGN PATENT DOCUMENTS

| | | |
|---|---|---|
| DE | 1720322 A1 | 6/1971 |
| DE | 2501348 A1 | 7/1976 |
| DE | 2732328 A1 | 2/1979 |
| DE | 3516434 A1 | 11/1986 |
| DE | 3732170 C1 | 2/1989 |
| DE | 3932793 A1 | 4/1990 |
| DE | 282618 | 9/1990 |
| DE | 4328013 C1 | 9/1994 |
| DE | 4324616 A1 | 1/1995 |
| DE | 4402917 | 8/1995 |
| DE | 19505150 A1 | 8/1996 |
| DE | 19510698 A1 | 9/1996 |
| DE | 19607723 A1 | 9/1997 |
| DE | 19752182 A1 | 5/1999 |
| DE | 10124579 A1 | 12/2002 |
| DE | 10251798 A1 | 5/2004 |
| JP | 2007185950 | 7/2007 |
| WO | 02094908 | 11/2002 |

* cited by examiner

METHOD AND DEVICE FOR THE PRODUCTION OF POLYAMIDE

CROSS REFERENCE TO RELATED APPLICATIONS

The present patent application claims priority and the benefit of co-pending International Patent Application No. PCT/DE2008/001929 filed Nov. 20, 2008, entitled "METHOD AND DEVICE FOR THE PRODUCTION OF POLYAMIDE", which claims priority to DE Application No. 10 2007 057 189.7 which was filed Nov. 28, 2007. These references are incorporated in their entirety herein.

FIELD

The present embodiments generally relate to a method for the production of polyamide 6 or copolyamides and a device for the production of polyamide 6 or copolyamides.

BACKGROUND

Polyamides are today used in a multiplicity of areas, such as for textiles, carpets or cords; in the production of injection moldings, such as in the automotive area; or in the production of plastic films or blown containers for packaging. In this connection, the multiplicity of positive properties is of particular significance, including the high durability and high thermal resistance combined with the good elasticity of polyamides.

An overview of various methods for the production of polyamides, including caprolactam-based polyamide 6 or copolyamides, is provided in Kunststoff-Handbuch [Plastics Manual], Volume 3 "Technische Thermoplaste" [Technical Thermoplastics], Subvolume 4 "Polyamide" [Polyamides], published by G. W. Becker and D. Braun, Hanser-Verlag Munich and Vienna, 1998, pages 22 to 75. An overview of spinning applications of polyamides can be found, for example, in "Synthetische Fasern" [Synthetic Fibres], Handbuch für Anlagenplanung [Manual of Plant Engineering], Franz Fourné, Hanser-Verlag Munich and Vienna, 1995, pages 36 to 56.

Generally, in established methods and devices for the production of polyamides, especially for the production of polyamide 6 or copolyamides, a caprolactam-based melt is subjected to polymerization. Accordingly, the produced polyamide melt is pelletized, for example by means of underwater pelletization or by means of strand pelletization. Such a pelletized polyamide material, however, usually still contains around 10% of low-molecular species or components, such as caprolactam and cyclic oligomers. In order to prevent a disruption by such low-molecular components during the further treatment of such a pelletized polyamide material, such low-molecular components are reduced by extraction to the level required for the particular application, the residual concentration thereof being thus adjusted. Conventionally, for this purpose, the pellets, which are dried after pelletization, are subjected to aqueous extraction, in the course of which the pellets conventionally take up considerable quantities of water. Consequently, such an extraction stage is followed by a further drying stage. The prior art makes use, for example, of inert-gas dryers, which are arranged downstream of a countercurrent extraction device.

The water at the outlet of the extraction stage typically has an extract concentration, i.e. a concentration of low-molecular components, of over 10% by weight. This extraction water is either returned directly to the polymerization process or is reprocessed after extraction. After extraction of the low-molecular components, the extracted low-molecular components are recovered and can then be returned to the polymerization process.

With regard to the above-described pelletization process, it must generally be ensured that there is compliance with a composition of the pelletization water that is suitable for a reliable pelletization process, with the extract concentration in the pelletization water normally being around 4% by weight. If this is not the case, the pelletization water cannot be optimally treated, because there is a foaming of the pelletization water.

The direct supply of pelletization water to the extraction stage could undesirably lower the extract concentration contained therein. The required degree of dryness of the polyamide pellets (commonly referred to as PA chips) at the inlet to the extraction stage is around 1% by weight.

Publication WO 02/094908 A1 describes a method and device for the extraction of polyamide wherein the pelletization of polyamide melt into pellets is followed by a separate extraction of the low-molecular (residual) components using a special extraction water under specific conditions, more particularly in a plurality of stages at increased temperature and pressure.

The object of the present embodiments are to overcome the disadvantages of the prior art and to provide a simple, cost-effective, and reliable method and device for the production of pellets of polyamide 6 or copolyamides, and to produce pellets of polyamide 6 or copolyamides that are capable of being further processed in a simple manner.

BRIEF DESCRIPTION OF THE DRAWINGS

The detailed description will be better understood in conjunction with the accompanying drawings as follows.

Figure 1:
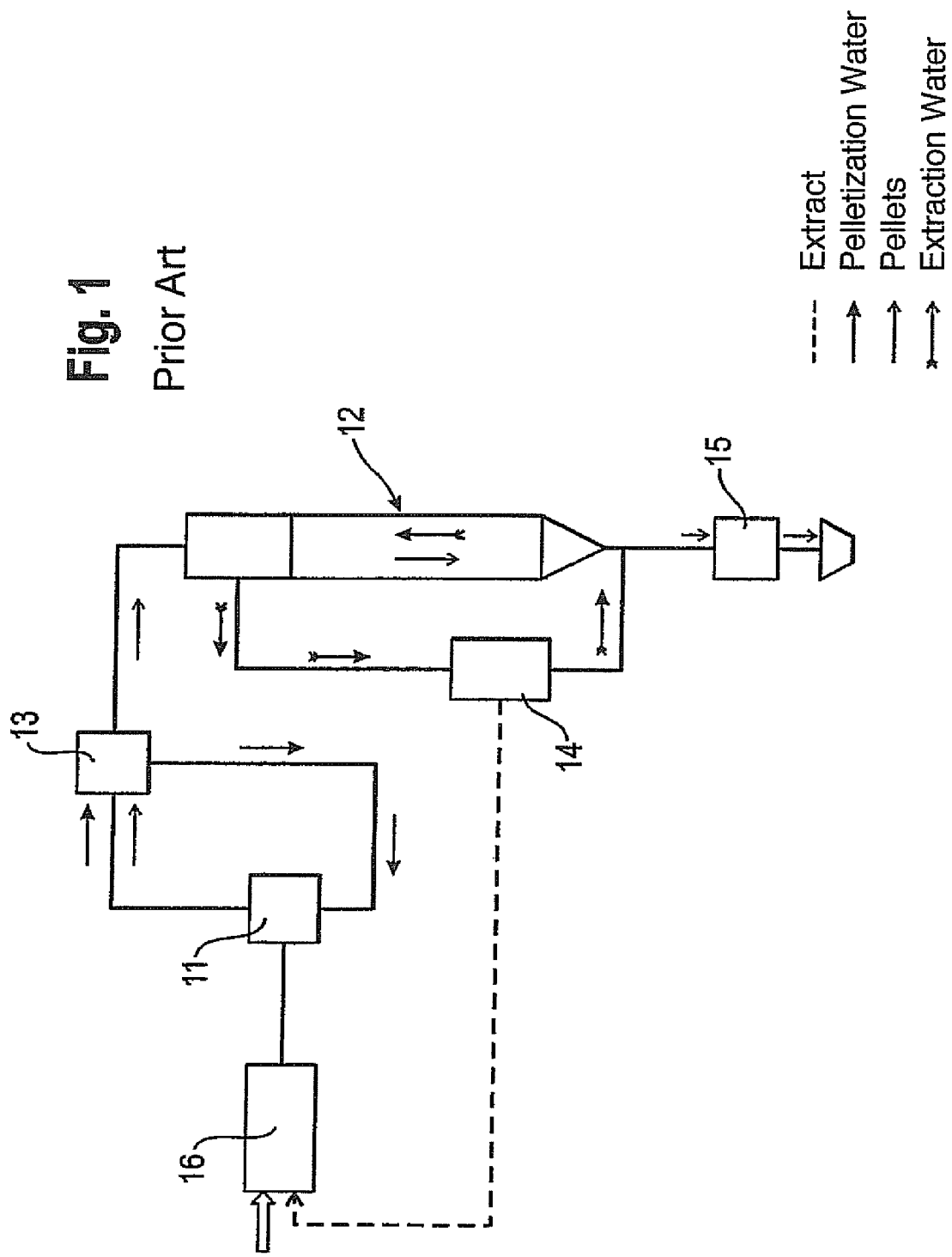
FIG. 1 depicts a schematic representation of a prior-art device

The present embodiments are detailed below with reference to the listed Figures.

DETAILED DESCRIPTION OF THE EMBODIMENTS

Before explaining the present device and method in detail, it is to be understood that the device and method are not limited to the particular embodiments and that the device and method can be practiced or carried out in various ways.

The present embodiments generally relate to a method for the production of polyamide 6 or copolyamides and a device for the production of polyamide 6 or copolyamides.

The method for the production of pellets of polyamide 6 or copolyamides can include producing a melt of polyamide 6 or copolyamides by means of polymerization. The means of polymerization can be caprolactam-based.

The method can include producing pellets from the melt by means of underwater pelletization. For example, the pellets can be made by using an underwater pelletizer of the kind produced and marketed by Automatik Plastics Machinery GmbH under the product name SPHERO. The pellets can be pelletized into a process fluid.

Furthermore, the method can include removing the pellets from the site of underwater pelletization in the process fluid.

The method can include supplying the pellets in the process fluid to an extraction stage.

The method can include extracting low-molecular components. For example, the low-molecular components can be components that were not completely polymerized. Extracting the low-molecular components can be performed using fluid-based or water-based extraction.

After the low-molecular components are extracted, the method can include drying the pellets.

In one or more embodiments the underwater pelletization and extraction of low-molecular weight components, also referred to as low molecular components, can be performed or can take place using the same process fluid. Accordingly, both the underwater pelletization stage and the extraction stage can take place using a process fluid that is the same for both stages of the method, i.e. the fluid that is used for the underwater pelletization stage is the same fluid that is used for the extraction stage. Therefore, the transport fluid for underwater pelletization can be the same as or substantially similar to the extraction fluid used for extraction. As such, a single process fluid can be used both for the pelletization stage, the transport of the pellets, and the extraction of low-molecular components from the pellets.

One or more embodiments of the invention can obviate the need for the intermediate drying phase that is typically provided in the prior art between the pelletization and extraction stages. In addition, one or more embodiments can enable the melt energy of the pellets that have been pelletized into the process water of the invention to be co-used for the required heating of the process fluid; thereby allowing energy savings to be made. This provides a method for the production of pellets of polyamide 6 or copolyamides that is simple, cost-effective, and reliable.

In one or more embodiments of the method, the process fluid can have a composition equivalent to a composition after the extraction stage. For example, the composition can be equivalent to a normally conventional composition after the extraction stage, and the process fluid can contain more than 10% by weight of extract, i.e. of low-molecular components. Consequently, the process fluid used in the method can have the composition of an extraction fluid, which can further improve the reliability of the method with regard to the production of pellets that can be further processed in a simple and especially easy manner.

In one or more embodiments of the method, the process fluid can be carried in a first circuit between the underwater pelletization stage and the extraction stage, and can be carried in a second circuit between the extraction stage and the treatment stage for removal of extract from the process fluid. The first circuit and the second circuit can have a fluid connection. The first circuit and the second circuit can at least partially overlap at the fluid connection. It is thus possible, in a technically simple and therefore cost-effective manner, to provide a closed circuit, two interconnected closed circuits, two directly interconnected closed circuits, or combinations thereof.

In one or more embodiments of the method, the process fluid in the first circuit can be at a temperature independent of the fluid in the second circuit, thereby further improving the reliability of pelletization. For example, the removal and supply of the pellets in the process fluid, and the return of the process fluid to the pelletization stage in the first circuit, such as in a fluid return connection, can be at a temperature that is independent of the second circuit, such as in an extraction fluid connection.

Furthermore, during underwater pelletization and during removal and supply of the pellets, the process fluid can be at an increased pressure with respect to ambient pressure. In one or more embodiments the pressure can be equal to or greater than 1 bar. For example, the pressure can be equal to or greater than 3 bar, or the pressure of the process fluid can be equal to or greater than 4 bar. The pressure difference can make it possible to reliably prevent, or to at least reduce any foaming of the process fluid.

In one or more embodiments of the method, the extraction stage can take place at a pressure lower than the increased pressure. For example, the extraction stage can be performed at ambient pressure. In one or more embodiments, before extraction, the pressure of the process fluid can be reduced from the increased pressure to the lower pressure. The extraction stage, therefore, can take place at a reduced pressure with respect to the pelletization stage.

In one or more embodiments of the method, the extraction stage can take place at the increased pressure, and the pressure can be reduced after the extraction stage. For example, the extraction of the low-molecular components can be performed at the increased pressure, and subsequent to the extraction of the low-molecular components and prior to drying, the pressure can be reduced from the increased pressure to a lower pressure, such as ambient pressure. Consequently, the pelletization and extraction stages can take place at increased pressure, such as at the same increased pressure. This can further increase the efficiency of the extraction stage, i.e. this can improve the effectiveness of the extraction of low-molecular components.

In one or more embodiments, a delivery rate of process fluid during underwater pelletization and during removal and supply of the pellets in the process fluid, and a delivery rate of process fluid during extraction, can all be adjusted to a delivery rate ratio of at least 3:1 in order to be able to further improve a smooth process under, where possible, all process conditions, including a high delivery rate.

One or more embodiments of the method can be perfumed using a device.

One or more embodiments of the device that can be used for the production of pellets of polyamide 6 or copolyamides can include an underwater pelletizer. The underwater pelletizer can receive or contain a melt of polyamide 6 or copolyamides. The polyamide 6 or copolyamides can be polymerized in a polymerization reactor, and the underwater pelletizer can pelletize pellets into a process fluid.

A fluid removal connection can be disposed between the underwater pelletizer and an extraction device. Accordingly, the process fluid with the contained pellets can be removed from the underwater pelletizer through the fluid removal connection and supplied to the extraction device.

A dryer can be positioned downstream of the extraction device. However, there is no need for a dryer upstream of the extraction device; accordingly, the dryer upstream of the extraction device can be omitted. The omission of the upstream dryer is possible because the underwater pelletizer and the extraction device are operated with the same process fluid.

A fluid return connection can also be disposed between the extraction device and the underwater pelletizer. The fluid return connection can provide the process fluid without pellets from the extraction device to the underwater pelletizer.

The composition of the process fluid can be adjusted by the addition of a treatment device. For example, a treatment device for the process fluid can be disposed adjacent or in the region of an extraction fluid connection of the extraction device.

In one or more embodiments of the device, the process fluid can be carried in a first circuit between the underwater pelletizer and the extraction device through the underwater pelletizer, the fluid removal connection, at least one part of the extraction device, a common fluid connection, and the fluid return connection. The process fluid can also be carried in a second circuit between the extraction device and a treatment device through the common fluid connection, the extraction fluid connection, the treatment device, and at least one part of the extraction device.

A common fluid connection can be disposed between the first circuit and the second circuit. Accordingly, the first circuit and the second circuit can at least partially overlap at the common fluid connection.

In the device, according to one or more embodiments, during removal and supply of the pellets in the process fluid and return of the process fluid to the pelletization stage in the first circuit, the process fluid in the first circuit can be at a temperature independent of the second circuit. One or more temperature-measuring and temperature-regulating devices can be provided in the respective regions/parts of the first circuit and the second circuit.

In one or more embodiments, the process fluid can be at an increased pressure with respect to ambient pressure, at least in the region of the underwater pelletizer. The process fluid can also have a reduced pressure relative to the increased pressure, at least in the extraction device.

At least one pressure reduction device can be disposed in the fluid removal connection. For example, a pressure reduction device can be disposed between the underwater pelletizer and the extraction device. This can allow for a simple adjustment of different pressure levels in the device.

In one or more embodiments, the region of the underwater pelletizer and the extraction device can have process fluid at an increased pressure with respect to ambient pressure. Also, a pressure reduction device can be disposed between the extraction device and the dryer. The dryer can be disposed downstream of the extraction device, i.e., it is possible for the extraction device to be a pressure extraction device.

The fluid removal connection of the device can have an air lock. The air lock can be used to remove pellets/agglomerates. This makes it possible for start-up material to be removed in a simple manner.

All the features and advantages of the invention that have been hereinabove described in connection with the method according to the invention also apply, mutatis mutandis, to the device according to the invention, and vice versa.

The embodiments of the device and method can be better understood with reference to the figures.

FIG. 1 shows a schematic representation of a device according to the prior art.

A polymerized melt of caprolactam-based polyamide 6 or copolyamides is produced in a polymerization reactor 16.

In an underwater pelletizer 11, the polymerized melt is pelletized into pellets in pelletization water. Next, the pellets are dried of the pelletization water in a dryer 13 and are then supplied to an extraction device 12.

The extraction process takes place in the extraction device 12 by means of extraction water in a separate extraction water circuit with an integrated treatment device 14 for recovery of the extract. The recovered extract can be returned to the polymerization reactor.

Extraction is followed by further drying of the pellets in a dryer 15. The pelletization water is treated in a separate circuit and is returned to the underwater pelletizer 11. The streams of material and water are identified by the corresponding arrows in FIG. 1.

Figure 2:
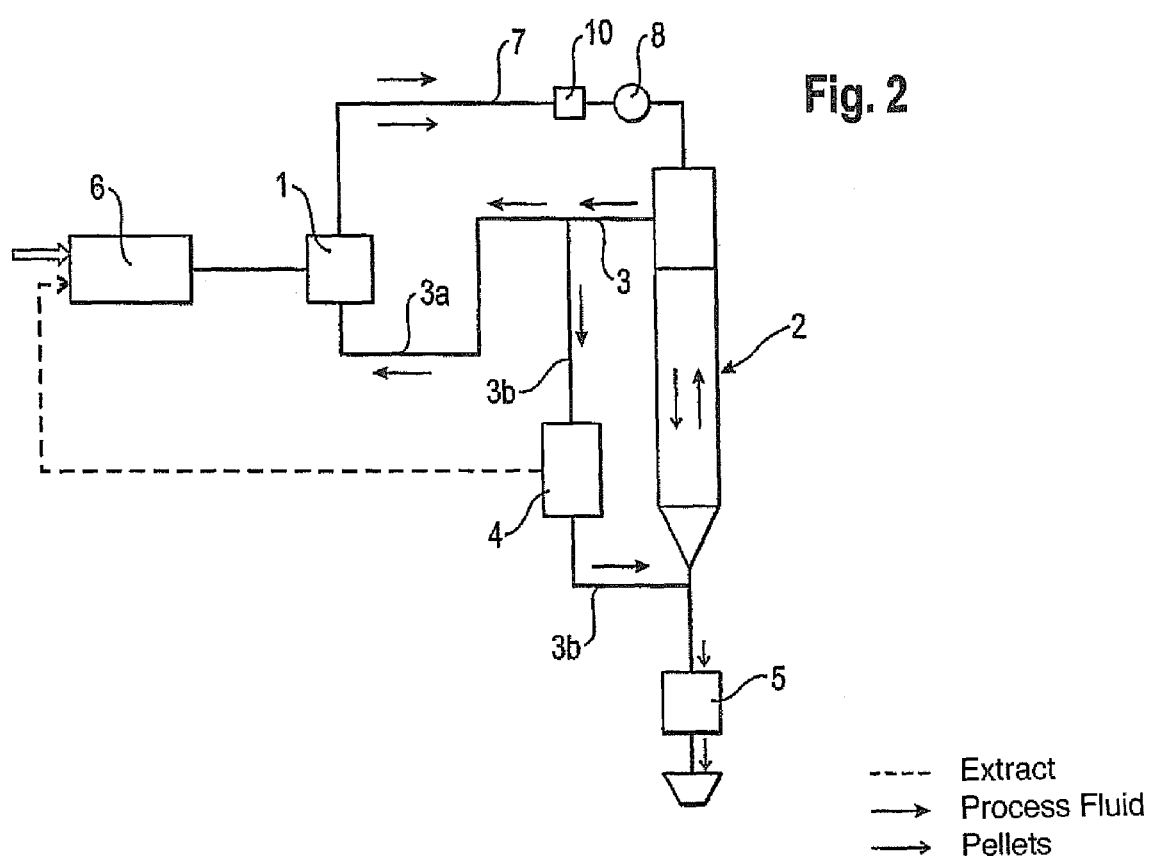
FIG. 2 depicts a schematic representation of a device for the production of pellets of polyamide 6 or copolyamides according to one or more embodiments.

FIG. 2 shows a schematic representation of an example of a device for the production of pellets of polyamide 6 or copolyamides. The device can be used to implement one or more embodiments of the method described herein.

A polymerized melt of caprolactam-based polyamide 6 or copolyamides or of suitable cyclic dimers/oligomers is produced in a polymerization reactor 6. The production of such a melt is otherwise known, and is therefore not described in any greater detail herein.

The device can also include an underwater pelletizer 1, which pelletizes the polymerized melt from the polymerization reactor 6 into the form of pellets into a process fluid. The process fluid with the pellets can be transported away from the underwater pelletizer 1 through a fluid removal connection 7.

The process fluid with the pellets can be supplied to an extraction device 2. This is indicated by the corresponding arrows in FIG. 2. In the embodiment presented in FIG. 2, a pressure reduction device 8 can be provided between the underwater pelletizer 1 and the extraction device 2 in the fluid removal connection 7. This makes it possible to reduce the increased pressure in the region of the underwater pelletizer 1 with respect to the lower pressure in the region of the extraction device 2.

The fluid removal connection 7 can be provided with an air lock 10 for the removal of pellets. The air lock 10 can be used during start-up of the device for the simple removal of pellets/agglomerates from a start-up material.

The mixture of process fluid and therein contained pellets can enter the extraction device 2. The pellets can be moved in a downward direction (see the region below the horizontal line in the extraction device 2 in FIG. 2). The process fluid can be supplied through the common fluid connection 3 and the fluid return connection 3a back to the underwater pelletizer 1, and can also be supplied through the extraction fluid connection 3b to a treatment device 4 and then through the extraction fluid connection 3b to the extraction device 2. There can be a delivery rate ratio of 3:1 between a delivery rate of process fluid during underwater pelletization through the underwater pelletizer 1 and the removal and supply of the pellets contained in the process fluid through the fluid removal connection 7 as well as through the fluid return connection 3a and a delivery rate of process fluid during extraction by the extraction device. In the embodiment presented in FIG. 2, the process fluid can flow from the bottom to the top through at least one part of the extraction device 2. The pellets can move in a downward direction. Both are indicated by the corresponding arrows in FIG. 2.

The device presented in FIG. 2 can form a first circuit between the underwater pelletizer 1 and the extraction device 2 through the underwater pelletizer 1, the fluid removal connection 7, at least one part of the extraction device 2, the common fluid connection 3, and the fluid return connection 3a; and can form a second circuit between the extraction device 2 and the treatment device 4 through the common fluid connection 3, the extraction fluid connection 3b, the treatment device 4, and at least one part of the extraction device 2. The common fluid connection 3 can be common to the first circuit and to the second circuit, with the result that the first circuit and the second circuit can partially overlap at least at that point.

The fluid connection for the process fluid between the extraction device 2 and the underwater pelletizer 1 can be through the fluid return connection 3a, and the fluid connection for the process fluid with the therein contained pellets can be through the fluid removal connection 7.

The device presented in FIG. 2 is, according to one or more embodiments, filled with a single process fluid and is operated therewith; i.e. the process fluid in the region of the underwater pelletizer 1 is the same as the process fluid in the region of the extraction device 2.

Removal of the pellets downstream of the extraction device 2 can be accomplished, for example, by means of a rotary seal air lock (not shown in FIG. 2). Provided downstream thereof is a dryer 5 for drying the pellets. After drying, the pellets can then be suitably stored and further processed.

The extract of low-molecular components obtained in the treatment device 4, wherein the extract was in the process fluid, can be recovered by the treatment device 4 and can be returned to the polymerization reactor 6 for polymerization. This is indicated by the broken line in FIG. 2. Furthermore, it can be seen in the region of the polymerization reactor 6 in FIG. 2 that the starting products for polymerization can be otherwise supplied to the polymerization reactor 6 from an external source (indicated by a corresponding arrow in the region of the polymerization reactor 6 in FIG. 2).

Figure 3:
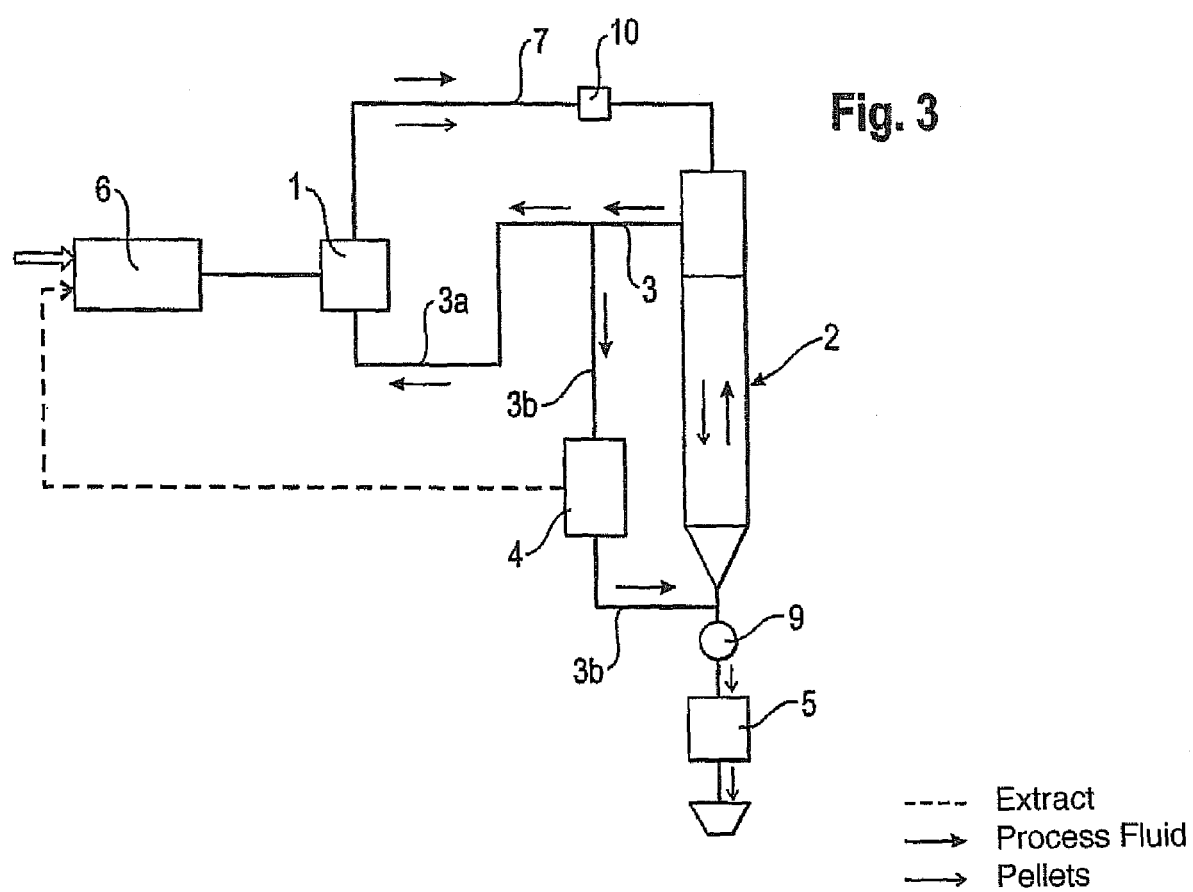
FIG. 3 depicts a schematic representation of another embodiment of a device for the production of pellets of polyamide 6 or copolyamides according to one or more embodiments.

The embodiments of the device presented in FIG. 2 and FIG. 3 can be provided in suitable places, more particularly at branches, with suitable valves, pressure and temperature sensors, feed pumps, filters, heat exchangers, and the like. For reasons of clarity of representation, however, such devices are not shown.

FIG. 3 shows a schematic representation of an example of a second embodiment of the device according to the present invention.

The embodiment presented in FIG. 3 differs from the embodiment presented in FIG. 2 in that, in FIG. 3, the pelletization and extraction stages take place at the same or at substantially the same increased pressure, and in that pressure reduction does not take place until before the dryer 5 through provision of a pressure reduction device 9 disposed between the extraction device 2 and the dryer 5. Otherwise, the embodiment presented in FIG. 3 is identical to the embodiment described in connection with FIG. 2.

With the device according to the invention as described hereinabove, it is possible to implement, in particular, the method according to the invention. This results in a simple and cost-effective means of reliably producing pellets of polyamide 6 or copolyamides, said pellets being particularly suitable for further processing.

While these embodiments have been described with emphasis on the embodiments, it should be understood that within the scope of the appended claims, the embodiments might be practiced other than as specifically described herein.

What is claimed is:

1. A device for production of pellets of polyamide 6 or copolyamides, the device comprising:
   a. a polymerization reactor to polymerize polyamide 6 or copolyamides to form a melt;
   b. an underwater pelletizer, wherein the underwater pelletizer receives the melt from the polymerization reactor, and wherein the underwater pelletizer pelletizes pellets into a process fluid;
   c. an extraction device in fluid communication with the underwater pelletizer, wherein the extraction device receives the process fluid and pellets contained within the process fluid from the underwater pelletizer through a fluid removal connection, and wherein the extraction device is adapted to perform extraction of low-molecular components by using fluid based or water based extraction; and
   d. a dryer positioned downstream of the extraction device for drying the pellets, wherein the underwater pelletizer and the extraction device are operated with the same process fluid, and wherein there is a fluid return connection for the process fluid disposed between the extraction device and the underwater pelletizer; and
   wherein the process fluid is carried in a first circuit between the underwater pelletizer and the extraction device through the underwater pelletizer, the fluid removal connection, at least one part of the extraction device, a common fluid connection, and the fluid return connection, wherein the process fluid is carried in a second circuit between the extraction device and a treatment device through the common fluid connection, an extraction fluid connection, the treatment device, and at least one part of the extraction device, and wherein the first circuit and the second circuit partially overlap at the common fluid connection.

2. The device of claim 1, further comprising the treatment device in fluid communication with the extraction fluid connection of the extraction device.

3. The device of claim 2, wherein the process fluid is at an increased pressure with respect to ambient pressure at least in a region of the underwater pelletizer, wherein the process fluid is at a lower pressure than the increased pressure at least in the extraction device, and wherein there is at least one pressure reduction device in the fluid removal connection between the underwater pelletizer and the extraction device.

4. The device of claim 1, wherein the process fluid is at an increased pressure with respect to ambient pressure in a region of the underwater pelletizer and in the extraction device, wherein there is a pressure reduction device disposed between the extraction device and the dryer, and wherein the dryer is positioned downstream of the extraction device.

5. The device of claim 1, wherein the process fluid is at an increased pressure with respect to ambient pressure at least in a region of the underwater pelletizer, wherein the process fluid is at a lower pressure than the increased pressure at least in the extraction device, and wherein there is at least one pressure reduction device in the fluid removal connection between the underwater pelletizer and the extraction device.

6. The device of claim 1, wherein the process fluid is at an increased pressure with respect to ambient pressure in a region of the underwater pelletizer and in the extraction device, wherein there is a pressure reduction device disposed between the extraction device and the dryer, and wherein the dryer is positioned downstream of the extraction device.

7. The device of claim 1, wherein the fluid removal connection comprises an air lock for the removal of the pellets, agglomerates, or combinations thereof.

* * * * *